United States Patent [19]

Barnes

[11] Patent Number: 4,888,219
[45] Date of Patent: Dec. 19, 1989

[54] TEMPERATURE SENSITIVE ARTIFICIAL FLOWER

[76] Inventor: Daniel F. Barnes, 112 Essex Ave., 36 D, Altamonte Springs, Fla. 32701

[21] Appl. No.: 373,819

[22] Filed: Jun. 30, 1989

[51] Int. Cl.⁴ .......................... A41G 1/00; C09K 19/02
[52] U.S. Cl. .......................................... 428/1; 428/26; 428/29; 428/913
[58] Field of Search .................. 428/1, 24, 25, 26, 29, 428/913

[56] References Cited

U.S. PATENT DOCUMENTS

| | | | |
|---|---|---|---|
| 1,938,736 | 12/1933 | Berman | 428/26 X |
| 3,704,625 | 12/1972 | Seto et al. | 428/1 X |
| 3,802,945 | 4/1974 | James | 428/1 |
| 4,028,118 | 6/1977 | Nakasuji et al. | 428/29 X |
| 4,048,359 | 9/1977 | Shibanai et al. | 428/1 |
| 4,060,654 | 11/1977 | Quenneville | 428/1 |
| 4,420,534 | 12/1983 | Matsui et al. | 428/374 X |
| 4,457,973 | 7/1984 | Matsui et al. | 428/374 X |
| 4,681,791 | 7/1987 | Shibahashi et al. | 428/240 X |
| 4,725,462 | 2/1988 | Kimura | 428/29 |
| 4,744,113 | 5/1988 | Kogut | 428/29 X |

FOREIGN PATENT DOCUMENTS 59-135428  8/1984  Japan ...................... 428/26

*Primary Examiner*—Henry F. Epstein
*Attorney, Agent, or Firm*—William M. Hobby, III

[57] ABSTRACT

An artificial flower apparatus has a stem with a plurality of petals attached to the stem with each petal having a polymer substrate and at least one petal having a thermochromatic liquid crystal mixture sandwiched between a transparent polymer substrate and an absorbing background material which thermochromatic liquid crystal mixture changes color responsive to changes in temperature thereof so that portions of the artificial flower changes color responsive to changes in temperature. The thermochromatic liquid crystal mixture may be microencapsulated and the flower petals may use different thermochromatic liquid crystal mixtures in order to provide a variety of colors among the artificial flower petals.

5 Claims, 1 Drawing Sheet

U.S. Patent
Dec. 19, 1989
4,888,219
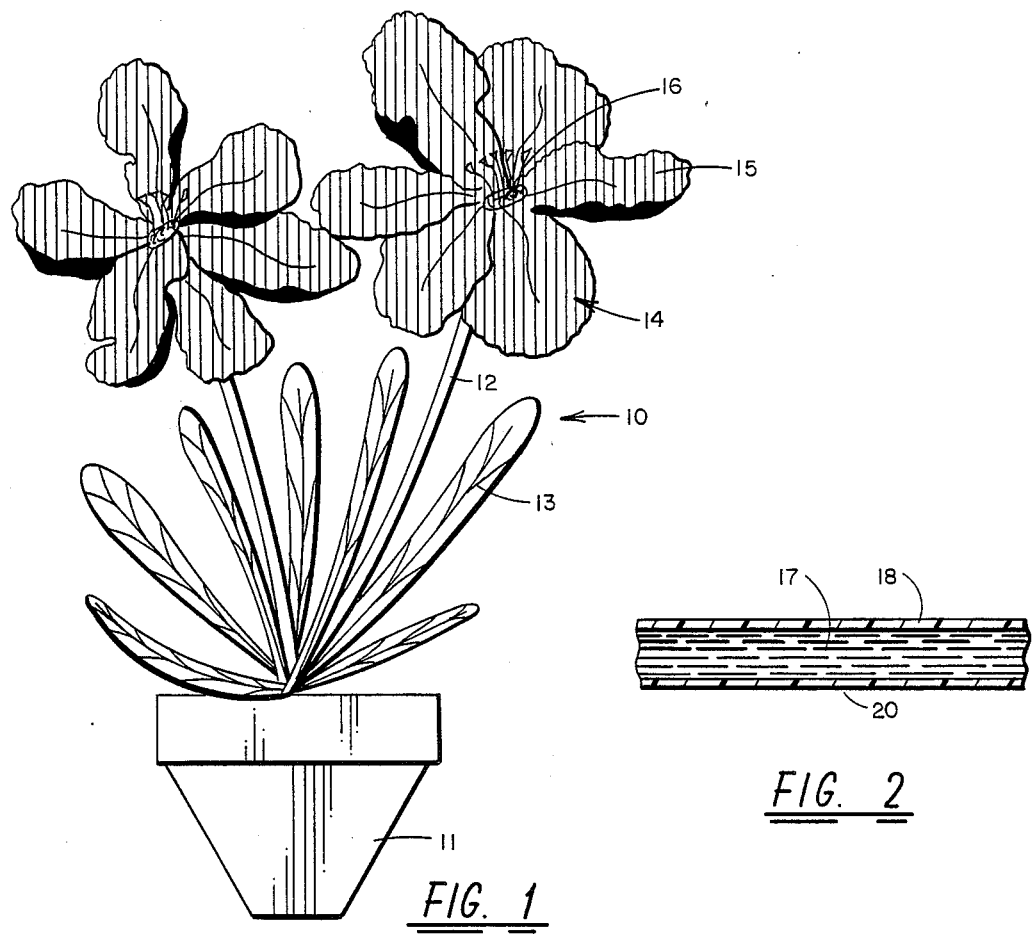
FIG. 1
FIG. 2
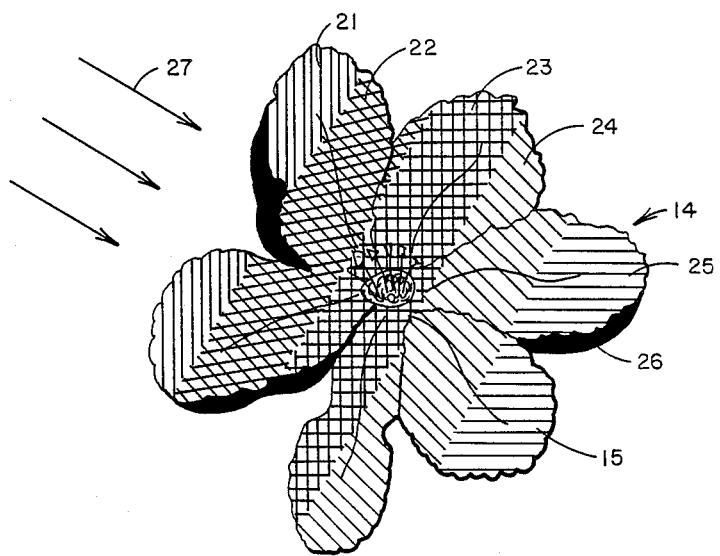
FIG. 3

TEMPERATURE SENSITIVE ARTIFICIAL FLOWER

BACKGROUND OF THE INVENTION

The present invention relates to artificial flowers and especially to artificial flowers which change color responsive to changes in temperature.

In the past, a variety of artificial flowers have been provided for use as decoration in the home and office. Typical, artificial flowers are made of various materials such as polymers, silk, cloth, and even dried plants and are designed to look like real plants including stems, leaves, and often blossoms. A typical artificial flower can be seen in prior U.S. Pat. No. 1,938,736 to Berman for a poinsettia plant having lights formed in the end of the stem for lighting up the plant.

In recent years, thermochromatic liquid crystals have been developed in a variety of mixtures for use in a variety of applications and are known to change polarization and color responsive to temperature changes in the liquid. It is also known to microencapsulate the thermochromatic liquid crystals. Prior art products which display a design or change responsive to temperature changes may be seen in the Kogut U.S. Pat. No. 4,744,113, for a toilet training aid and method having porous sheet of paper with an invisible picture thereon placed over a toilet bowl which produces an image when wetted by warm liquid. In the Kimura U.S. Pat. No. 4,725,462, heat activated indicia on textiles uses thermochromatic colors formed into a textile to form an image. The indicia is not visible to the naked eye in the normal ambient temperatures but when subjected to a predetermined temperature, such as when immersed in bath water, an image appears to the user.

In the present invention, an artificial flower is formed having petals with thermochromatic liquid crystal mixtures of predetermined mixtures in a variety of leaves to form changes in the leaf color when the room or nearby temperature changes to thereby change colors so that the artificial plant appears in a variety of colored petals which constantly change.

SUMMARY OF THE INVENTION

The present invention relates to artificial flowers and especially to artificial flowers having petals which change color responsive to changes in temperature. The artificial flowers includes one or more stems along with a plurality of leaves or blossom petals attached to each stem with each petal having a polymer substrate and at least one petal having a thermochromatic liquid crystal mixture sandwiched betwen a transparent polymer substrate and an absorbing background material which thermochromatic liquid crystal mixture changes color responsive to changes in temperature of the mixture so that portions of the artificial flower change color responsive to changes in temperature. The petal thermochromatic liquid crystal mixture may be microencapsulated and each petal may have a different thermochromatic liquid crystal mixture therein with each mixture adapted to change color at different temperatures so that the petals can have a variety of changing colors responsive to temperature changes. Each petal polymer substrate can be a clear polyester polymer and can sandwich the mixture between the clear polymer and a light absorbing backing.

BRIEF DESCRIPTION OF THE DRAWINGS

Other objects, features, and advantages of the present invention will be apparent from the written description and the drawings in which:

FIG. 1 is a side elevation of an artificial plant in accordance with the present invention;

FIG. 2 is a sectional view taken through a portion of one petal of a sandwiched liquid crystal mixture; and FIG. 3 is an elevation view of one artificial plant blossom on the end of one stem illustrating different color changes.

DESCRIPTION OF THE PREFERRED EMBODIMENT

Referring to the drawings and especially to FIG. 1, an artificial plant 10 is placed in a conventional plant pot 11 and has a plurality of stems 12 protruding from the plant pot 11 along with a plurality of leaves 13 and a plurality of blossoms 14 having a plurality of blossom petals 15. In the embodiment of FIG. 1, a plurality of stamen 16 can be seen protruding from the center of the bloom 14. Each blossom petal 15 has a thermochromatic liquid crystal mixture 17 as shown in FIG. 2 sandwiched between a transparent polymer substrate 18 and an opaque or black sandwiching layer 20. The thermochromatic liquid crystal mixture 17 is microencapsulated.

Thermochromatic liquid crystals are used as temperature indicators and can be formulated in a wide variety of mixtures to change different colors responsive to changes in temperature. The materials can be Cholesteric or Chiral Nematic liquid crystals and are organic chemicals which can change colors responsive to changes in the temperature of the crystals. Depending upon the crystal and the mixture, temperatures can cause a change in colors. Such chemicals are used in digital thermometers as well as in medical thermography and the chemicals can be stabilized for isolating the liquid crystals with a protective microencapsulation barrier. The crystals are commercially available in mixtures from companies, such as the Hallcrest Company of Glenview, Ill., who will tailor make the temperature sensitive sheets and films to the requirements of a customer.

In the present application, it is anticipated that a range of colors, such as shown in FIG. 3, will have the petals of the blossoms varying between red, orange, yellow, green, blue and black responsive to change in the ambient temperature as well as to heat from the sunlight impinging upon the blooms as shown in 3. Thus, thermochromatic liquid crystal mixtures are selected to change colors in a range from 32° F. to 100° F. as described for a particular artificial plant. One particular thermochromatic color compound is illustrated in the cited Kimura U.S. Pat. No. 4,725,462.

As seen in FIG. 3, the petals 15 of the bloom 14 have a cross-section of colors with red 21, orange 22, yellow 23, green 24, blue 25, and having black 26 on the base of the bloom. The colors are constantly changing responsive to variations in temperature from the sun rays 27 and the like impinging upon the plant to increase the temperature and again responsive to the thermochromatic chemicals cooling down following removal of the sun rays and the cooling down of the area around the artificial plant 10.

It should be clear at this time that the present invention provides a novel artificial flower which can continuously change colors and designs by merely being placed in an area where the sunlight comes and goes and where the ambient temperature changes from time-to-time. This can, of course, be outside or inside as desired without departing from the spirit and scope of the invention. Accordingly, the present invention is not to be construed as limited to the forms shown which are to be considered illustrative rather than restrictive.

I claim:

1. An artifical flower comprising:
   a stem;
   a plurality of blossom petals attached to said stem, each said petal having a polymer substrate; and
   at least one said petal having a thermochromatic liquid crystal mixture sandwiched between a transparent polymer substrate and an absorbing background material which thermochromatic liquid crystal mixture changes color responsive to changes in temperature thereof whereby portions of said artificial flower change color responsive to changes in temperature.

2. An artificial flower in accordance with claim 1 in which said one petal thermochromatic liquid crystal mixture is microencapsulated.

3. An artificial flower in accordance with claim 2 in which each said petal has a different thermochromatic liquid crystal mixture therein, each said mixture changing color at a different temperature, whereby said petals can have a variety of changing color as temperatures change.

4. An artificial flower in accordance with claim 3 in which each said petal has a plurality of different thermochromatic liquid crystal mixtures therein, each said mixture changing color at a different temperature, whereby each said petal can have a variety of changing colors as temperatures change.

5. An artificial flow in accordance with claim 1 in which each said petal polymer substrate is a clear polyester polymer.

* * * * *